(12) United States Patent
Mizutani et al.

(10) Patent No.: US 11,239,693 B2
(45) Date of Patent: Feb. 1, 2022

(54) ON-BOARD POWER SUPPLY SYSTEM AND ON-BOARD CONTROL APPARATUS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Tomohiro Mizutani, Mie (JP); Tsuyoshi Kontani, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 48 days.

(21) Appl. No.: 16/612,502

(22) PCT Filed: Apr. 24, 2018

(86) PCT No.: PCT/JP2018/016580
§ 371 (c)(1),
(2) Date: Nov. 11, 2019

(87) PCT Pub. No.: WO2018/211922
PCT Pub. Date: Nov. 22, 2018

(65) Prior Publication Data
US 2020/0099253 A1 Mar. 26, 2020

(30) Foreign Application Priority Data
May 15, 2017 (JP) .............................. JP2017-096685

(51) Int. Cl.
*B60L 1/00* (2006.01)
*B60L 3/00* (2019.01)
(Continued)

(52) U.S. Cl.
CPC ........ *H02J 13/0003* (2013.01); *B60R 16/033* (2013.01)

(58) Field of Classification Search
CPC ............... H02J 13/0003; H02J 2310/40; H02J 13/00016; H02J 13/00036; B60R 16/033; B60R 16/03
(Continued)

(56) References Cited

U.S. PATENT DOCUMENTS

2003/0123205 A1* 7/2003 Ashiya .................. H02H 3/085
361/93.1
2016/0059807 A1 3/2016 Iwasaki et al.
(Continued)

FOREIGN PATENT DOCUMENTS

WO 2015-076303 A1 5/2015

OTHER PUBLICATIONS

International Search Report, Application No. PCT/JP2018/016580, dated Jul. 3, 2018. ISA/Japan Patent Office.

*Primary Examiner* — Richard Tan
(74) *Attorney, Agent, or Firm* — Honigman LLP (57) ABSTRACT

An on-board control apparatus includes: a controller connected to a controlled device mounted in a vehicle via a signal line and configured to control the operation of the corresponding controlled device; and a power source box connected to a power source mounted in the vehicle via a power line, that is connected to the controlled device mounted in the vehicle via a power line, and configured to switch between supply and non-supply of power from the power source to the controlled device, wherein the power source box includes; a switch disposed in a power supply path from the power source to the controlled device; a reception unit configured to receive an input of the switching command; and a switching control unit configured to switch
(Continued)

between conduction and interruption of the switch in response to the switching command received by the reception unit.

6 Claims, 7 Drawing Sheets

(51) Int. Cl.
*H02G 3/00* (2006.01)
*H02J 13/00* (2006.01)
*B60R 16/033* (2006.01)

(58) Field of Classification Search
USPC .................................................. 307/10.1
See application file for complete search history.

(56) References Cited

U.S. PATENT DOCUMENTS

2017/0080883 A1    3/2017  Yasunori et al.
2019/0165433 A1*   5/2019  Shiraishi .................. H02J 7/14

* cited by examiner

Legend
A= In-vehicle network

ON-BOARD POWER SUPPLY SYSTEM AND ON-BOARD CONTROL APPARATUS

This application is the U.S. national stage of PCT/JP2018/016580 filed on Apr. 24, 2018, which claims priority of Japanese Patent Application No. JP 2017-096685 filed on May 15, 2017, the contents of which are incorporated herein.

TECHNICAL FIELD

The present disclosure relates to an on-board power supply system and an on-board control apparatus that control the operation of a controlled device mounted in a vehicle, and that control supply of power to the controlled device.

BACKGROUND

A large number of devices are mounted in a vehicle, and these devices operate by being supplied with power from an on-board power source such as a battery. An apparatus called a power source box is provided in the power supply path from the power source to each device. The power source box is connected to the power source via a power line, and is connected to the devices via individual power lines. A plurality of switches are built in the power source box, and supply and non-supply of power from the power source to the device can be switched. On the other hand, the operation of the device mounted in the vehicle is performed by, for example, an ECU (Electronic Control Unit). In a conventional vehicle, the ECU controls the switching of each switch of the power source box, thereby switching between supply and non-supply of power to the device to be controlled by that ECU.

In JP 2015-217734A, a power source apparatus for an automobile having a configuration is proposed in which, in a power source box interposed between a plurality of storage batteries and loads, a switch means for selecting whether to supply power from each storage battery to the load and a switch control unit that controls the switch means to select a storage battery that supplies power according to the output voltage value of each storage battery are provided, so that a storage battery selection operation can be performed by the switch control unit based on a control signal that is output from a load control unit that controls the loads.

In recent years, the number of devices mounted in a vehicle has increased, and it has been studied to reduce the number of devices by integrating (uniting) a plurality of devices into one device. As one plan for integration, it is conceivable to integrate the above-mentioned ECU and the power source box into one apparatus. In this case, a device to be controlled is connected to the ECU integrated with the power source box via a signal line and a power line, and the ECU performs operation control and power source control in an integrated manner.

However, in the configuration in which the ECU integrated with the power source box performs the operation control and the power source control of the device in an integrated manner, when a plurality of devices to be controlled are disposed at separate locations in the vehicle, the power line connecting the ECU and each device becomes long. As a result, the amount of the power lines mounted in the vehicle may increase.

The present disclosure has been made in view of such circumstances, and an object thereof is to provide an on-board power supply system and an on-board control apparatus capable of reducing the number of devices mounted in a vehicle by integrating a power source box and an ECU, and suppressing an increase in the amount of power lines in the vehicle.

SUMMARY

An on-board power supply system according to the present disclosure includes on-board control apparatuses each including a controller that is connected to a controlled device mounted in a vehicle via a signal line and that is configured to control the operation of the corresponding controlled device, and a power source box that is connected to a power source mounted in the vehicle via a power line, that is connected to the controlled device mounted in the vehicle via a power line, and that is configured to switch between supply and non-supply of power from the power source to the controlled device, wherein, to the power source box included in one of the on-board control apparatuses, a controlled device that is to be controlled by the controller included in another one of the on-board control apparatuses is connected, and the power source box included in the one of the on-board control apparatuses is configured to switch between supply and non-supply of power to the controlled device that is connected to the one of the on-board control apparatuses, in response to a switching command from the controller included in the other one of the on-board control apparatuses.

In the on-board power supply system according to the present disclosure, the power source boxes may each include a switch that is disposed in a power supply path from the power source to the controlled device, a reception unit configured to receive an input of the switching command, and a switching control unit configured to switch between conduction and interruption of the switch in response to the switching command received by the reception unit.

In the on-board power supply system according to the present disclosure, each reception unit may be configured to receive the switching command via an in-vehicle network provided in the vehicle.

In the on-board power supply system according to the present disclosure, a plurality of the on-board control apparatuses and a plurality of the controlled devices may be mounted in the vehicle, and each controlled device is connected to the power source box of the nearest on-board control apparatus via a power line, and is connected to the controller of the on-board control apparatus that is configured to control the controlled device via a signal line.

The on-board control apparatus according to the present disclosure is an on-board control apparatus that includes a controller that is connected to a controlled device mounted in a vehicle via a signal line and that is configured to control the operation of the corresponding controlled device, and a power source box that is connected to a power source mounted in the vehicle via a power line, that is connected to the controlled device mounted in the vehicle via a power line, and that is configured to switch between supply and non-supply of power from the power source to the controlled device, wherein the power source box includes a switch that is disposed in a power supply path from the power source to the controlled device, a reception unit configured to receive a switching command from another apparatus, and a switching control unit configured to switch between conduction and interruption of the switch in response to the switching command received by the reception unit.

In the present disclosure, a vehicle includes on-board control apparatuses in each of which a controller configured to control the operation of a controlled device is integrated with a power source box configured to switch between supply and non-supply of power from a power source to the controlled device. To the power source box of one of the on-board control apparatuses, a controlled device that is to be controlled by the controller of another one of the on-board control apparatuses is connected via a power line. The power source box of the one of the on-board control apparatuses switches between supply and non-supply of power to the controlled device that is connected to the one of the on-board control apparatuses, in response to a switching command from the controller of the other on-board control apparatus.

In this manner, even in the on-board control apparatus in which the controller and the power source box are integrated, the degree of freedom of connection between the power source box of the on-board control apparatus and a controlled device via a power line in the vehicle is increased, by making it possible to connect a controlled device that is not to be controlled by the corresponding controller to the power source box. This makes it possible to suppress an increase in the amount of the power lines.

In the present disclosure, a switch for switching between supply and non-supply of power to the controlled device, a reception unit that receives a switching command from the other on-board control apparatus, and a switching control unit that switches between conduction and interruption of the switch in response to the received switching command are provided in the power source box of the on-board control apparatus. With this configuration, the power source box, which is integrated, can switch between supply and non-supply of power to the controlled device, which is not to be controlled by the controller, without hindering the processing of the controller that controls the operation of the controlled device.

In the present disclosure, the reception unit of the power source box receives a switching command via the in-vehicle network. In this manner, it is not necessary to provide a separate signal line for transmitting and receiving a switching command, because the power source box can receive a switching command from the other on-board control apparatus using the existing in-vehicle network. Accordingly, it is possible to suppress an increase in the amount of the signal lines in the vehicle.

In the present disclosure, if a plurality of on-board control apparatuses and a plurality of controlled devices are mounted in the vehicle, each controlled device is connected to the power source box of the nearest on-board control apparatus via the power line, and is connected to the controller of the on-board control apparatus that controls the controlled device via the signal line. In this manner, the length of the power line that connects the power source box of the on-board control apparatus and the controlled device can be shortened, and an increase in the amount of the power lines in the vehicle can be suppressed.

Advantageous Effects of Disclosure

In the present disclosure, an increase in the amount of the power lines in a vehicle can be suppressed in an on-board control apparatus in which a controller and a power source box are integrated, by employing a configuration in which a controlled device that is not to be controlled by the controller can be connected to the power source box.

DETAILED DESCRIPTION OF PREFERRED EMBODIMENTS

System Configuration

Figure 1:
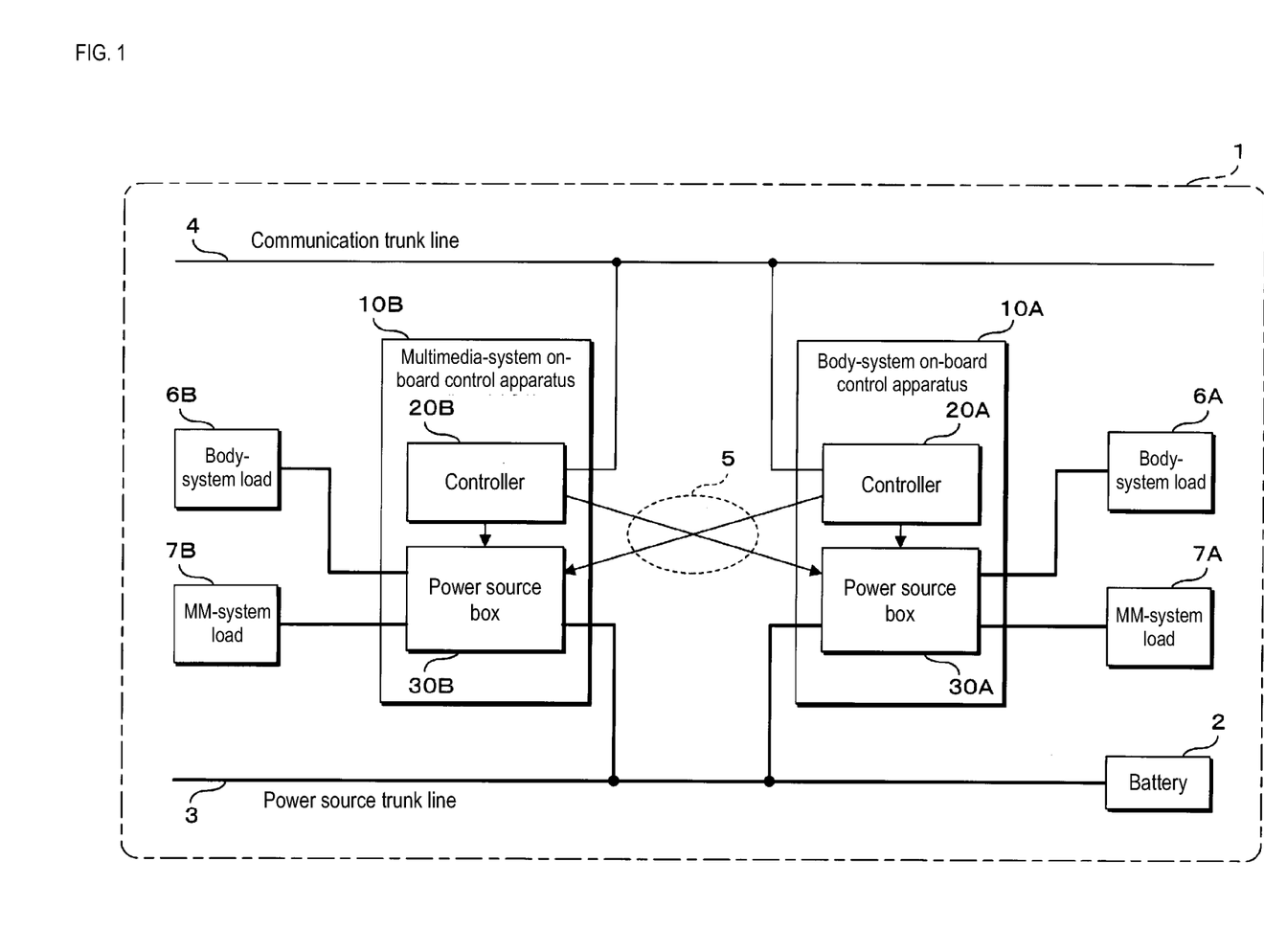
FIG. 1 is a schematic view showing a configuration example of an on-board power supply system according to the present embodiment.
Figure 2:
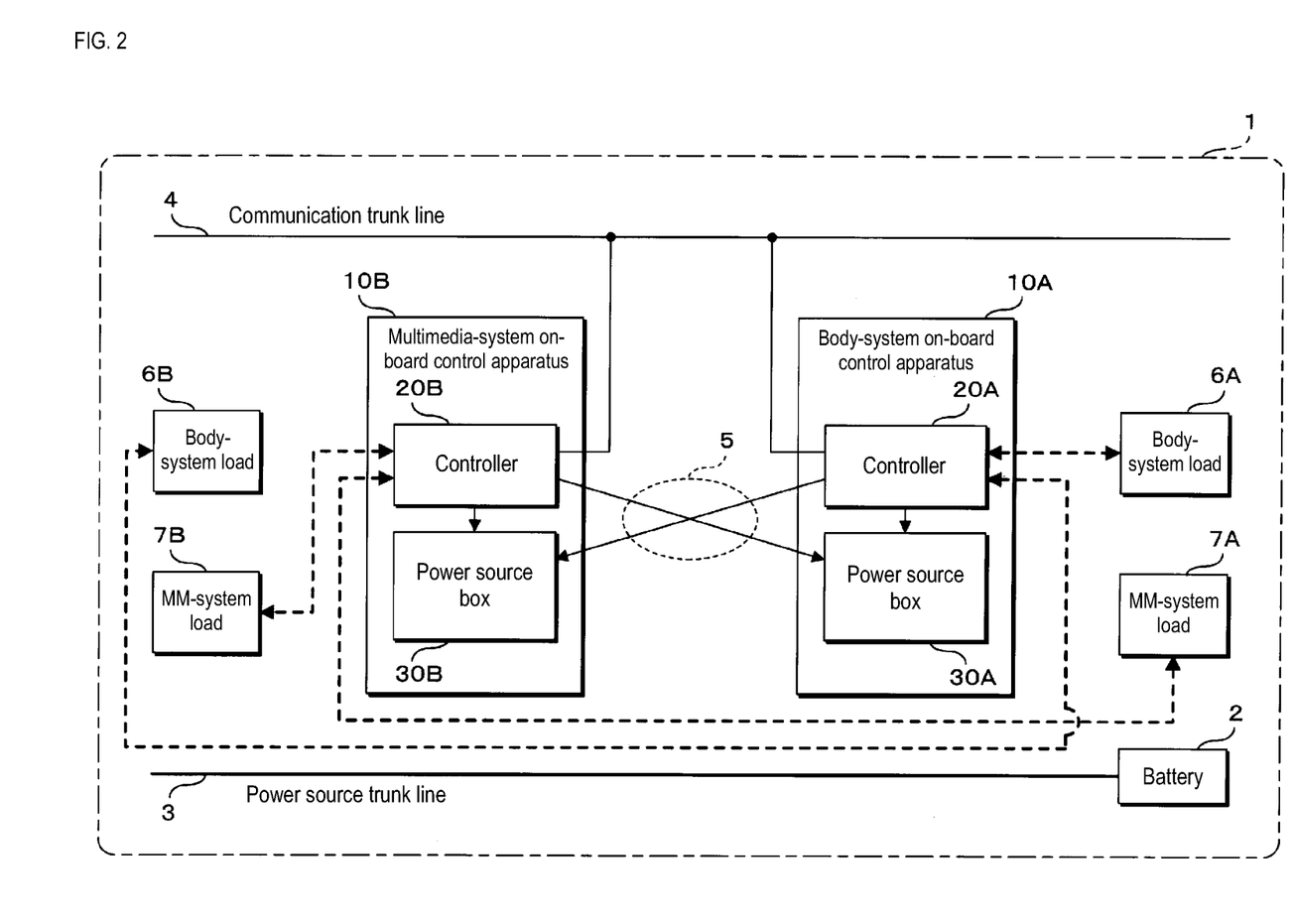
FIG. 2 is a schematic view showing a configuration example of the on-board power supply system according to the present embodiment.

FIGS. 1 and 2 are schematic views each showing a configuration example of an on-board power supply system according to the present embodiment. The on-board power supply system according to the present embodiment is a system that controls the operations of a plurality of controlled devices (hereinafter referred to as "loads") mounted in a vehicle 1, and that controls the supply of power from a battery 2 to the plurality of loads mounted in the vehicle 1. Note, that FIG. 1 illustrates a configuration related to supply of power to the loads in the on-board power supply system, and power supply paths from the battery 2 to the loads are shown by thick solid lines. Also, FIG. 2 illustrates a configuration related to the operation control of the loads in the on-board power supply system, and transmission paths of control signals to the loads are shown by thick broken arrows.

In the on-board power supply system according to the present embodiment, supply or non-supply of power from the battery 2 to each load is switched and controlled by a plurality of on-board control apparatuses mounted in the vehicle 1. As shown in FIG. 1, body-system loads 6A and 6B and multimedia-system loads (referred to as "MM-system load" in the figures) 7A and 7B are mounted in the vehicle 1. Two on-board control apparatuses, a body-system on-board control apparatus 10A and a multimedia-system on-board control apparatus 10B, control supply and non-supply of power from the battery 2 to the loads. The on-board control apparatus according to the present embodiment is an apparatus obtained by integrating (uniting) a controller, such as a conventional ECU or a domain controller, and a power source box for power supply. In the example shown in the figures, the body-system on-board control apparatus 10A includes a controller 20A and a power source box 30A. The multimedia-system on-board control apparatus 10B includes a controller 20B and a power source box 30B.

In the present embodiment, the vehicle 1 is provided with a power source trunk line 3 and a communication trunk line 4. The power source trunk line 3 is a trunk line that can be called an energy backbone. The power source trunk line 3 is constructed, for example, by laying one power line from the battery 2 mounted on the front side of the vehicle 1 to the rear side of the vehicle 1. Branch lines obtained by branching the power source trunk line 3 at appropriate locations are connected to the devices mounted in the vehicle 1, and power is supplied from the battery 2 to devices. In the example shown in FIG. 1, two branch lines are branched from the power source trunk line 3, and are respectively connected to the power source box 30A of the body-system on-board control apparatus 10A and the power source box 30B of the multimedia-system on-board control apparatus 10B. The branch positions of the branch lines from the power source trunk line 3 can be in the vicinity of the installation positions in the vehicle 1 of the body-system on-board control apparatus 10A and the multimedia-system on-board control apparatus 10B, to which these branch lines are connected respectively.

Similarly, the communication trunk line 4 is constructed by laying a communication line from the front side to the rear side of the vehicle 1, for example. The configuration of the communication trunk line 4 depends on the communication protocol. If communication is performed, for example, via a bus such as the CAN (Controller Area Network) communication protocol, the communication trunk line 4 may be a single bus or a set of buses. Also, if a star-type network configuration such as the Ethernet (registered trademark) communication protocol is employed, a plurality of repeaters such as hubs are arranged in the front-rear direction of the vehicle 1, and the plurality of repeaters connected by communication lines can be used as the communication trunk line 4. In the example shown in FIG. 2, two branch lines are branched from the communication trunk line 4, and are respectively connected to the controller 20A of the body-system on-board control apparatus 10A and the controller 20B of the multimedia-system on-board control apparatus 10B. With this configuration, the body-system on-board control apparatus 10A and the multimedia-system on-board control apparatus 10B can perform communication via the communication trunk line 4. For communication via the communication trunk line 4, various communication protocols such as CAN, CAN-FD (CAN with Flexible Data rate), Ethernet, MOST (Media Oriented Systems Transport), or FlexRay may be employed, for example. Also, if a PLC (Power Line Communication) protocol is employed, the power source trunk line 3 and the communication trunk line 4 may also be integrated.

In the present embodiment, an in-vehicle network 5 is provided in the vehicle 1, apart from the network using the communication trunk line 4. The in-vehicle network 5 can be a network that employs a communication protocol such as CAN, and may be slower than the network using the communication trunk line 4. In the present embodiment, the controller 20A and the power source box 30A of the body-system on-board control apparatus 10A and the controller 20B and the power source box 30B of the multimedia-system on-board control apparatus 10B are connected to the in-vehicle network 5. With this configuration, the controllers 20A and 20B and the power source box 30A and 30B can perform communication via the in-vehicle network 5. Accordingly, the controller 20A can transmit a switching command or the like to the power source box 30B, and the controller 20B can transmit a switching command or the like to the power source box 30A.

The body-system loads 6A and 6B are devices such as lights, wipers, windows, doors, or door locks of the vehicle 1, for example, and are loads whose operations are controlled by the controller 20A of the body-system on-board control apparatus 10A. For this reason, as shown in FIG. 2, the body-system loads 6A and 6B are connected to the controller 20A of the body-system on-board control apparatus 10A, and receive a signal or the like that controls the operation from the controller 20A. Note, that the control signal from the controller 20A to the body-system loads 6A and 6B may also be provided via the network using the communication trunk line 4.

Regarding the power supply path, the body-system loads 6A and 6B are not necessarily connected to the power source box 30A of the body-system on-board control apparatus 10A. In the present embodiment, each load of the vehicle 1 can be connected to the power source box of the closest (nearest) on-board control apparatus via a power line. It is assumed that, for example, the body-system on-board control apparatus 10A is mounted on the front side of the vehicle 1, the multimedia-system on-board control apparatus 10B is mounted on the rear side of the vehicle 1, the body-system load 6A is mounted on the front side of the vehicle 1, and the body-system load 6B is mounted on the rear side of the vehicle 1. In this case, as shown in FIG. 1, the body-system load 6A on the front side of the vehicle 1 is connected to the power source box 30A of the body-system on-board control apparatus 10A, and the body-system load 6B on the rear side of the vehicle 1 is connected to the power source box 30B of the multimedia-system on-board control apparatus 10B.

The multimedia-system loads 7A and 7B are devices such as a display, a speaker, or a camera, for example, and are loads whose operations are controlled by the multimedia-system on-board control apparatus 10B. Accordingly, as shown in FIG. 2, the multimedia-system loads 7A and 7B are connected to the controller 20B of the multimedia-system on-board control apparatus 10B, and receive a signal or the like for controlling their operations from the controller 20B. Note, that the control signal from the controller 20B to the multimedia-system loads 7A and 7B may also be provided via the network using the communication trunk line 4.

Similar to the body-system loads 6A and 6B, regarding the power supply path, the multimedia-system loads 7A and 7B are not necessarily connected to the power source box 30B of the multimedia-system on-board control apparatus 10B. It is assumed that, for example, the body-system on-board control apparatus 10A is mounted on the front side of the vehicle 1, the multimedia-system on-board control apparatus 10B is mounted on the rear side of the vehicle 1, the multimedia-system load 7A is mounted on the front side of the vehicle 1, and the multimedia-system load 7B is mounted on the rear side of the vehicle 1. In this case, as shown in FIG. 1, the multimedia-system load 7A on the front side of the vehicle 1 is connected to the power source box 30A of the body-system on-board control apparatus 10A, and the multimedia-system load 7B on the rear side of the vehicle 1 is connected to the power source box 30B of the multimedia-system on-board control apparatus 10B.

The power source boxes 30A and 30B switch between supply and non-supply of power from the battery 2 to each load in response to a switching command provided from the controllers 20A and 20B. In the present embodiment, the power source box 30A of the body-system on-board control apparatus 10A switches between supply and non-supply of power to the body-system load 6A in response to a switching command that is directly provided from the controller 20A of the body-system on-board control apparatus 10A, and switches between supply and non-supply of power to the multimedia-system load 7A in response to a switching command that is provided from the controller 20B of the multimedia-system on-board control apparatus 10B via the in-vehicle network 5. Similarly, the power source box 30B of the multimedia-system on-board control apparatus 10B switches between supply and non-supply of power to the body-system load 6B in response to a switching command that is provided from the controller 20A of the body-system on-board control apparatus 10A via the in-vehicle network 5, and switches between supply and non-supply of power to the multimedia-system load 7B in response to a switching command that is directly provided from the controller 20B of the multimedia-system on-board control apparatus 10B.

Apparatus Configuration

Figure 3:
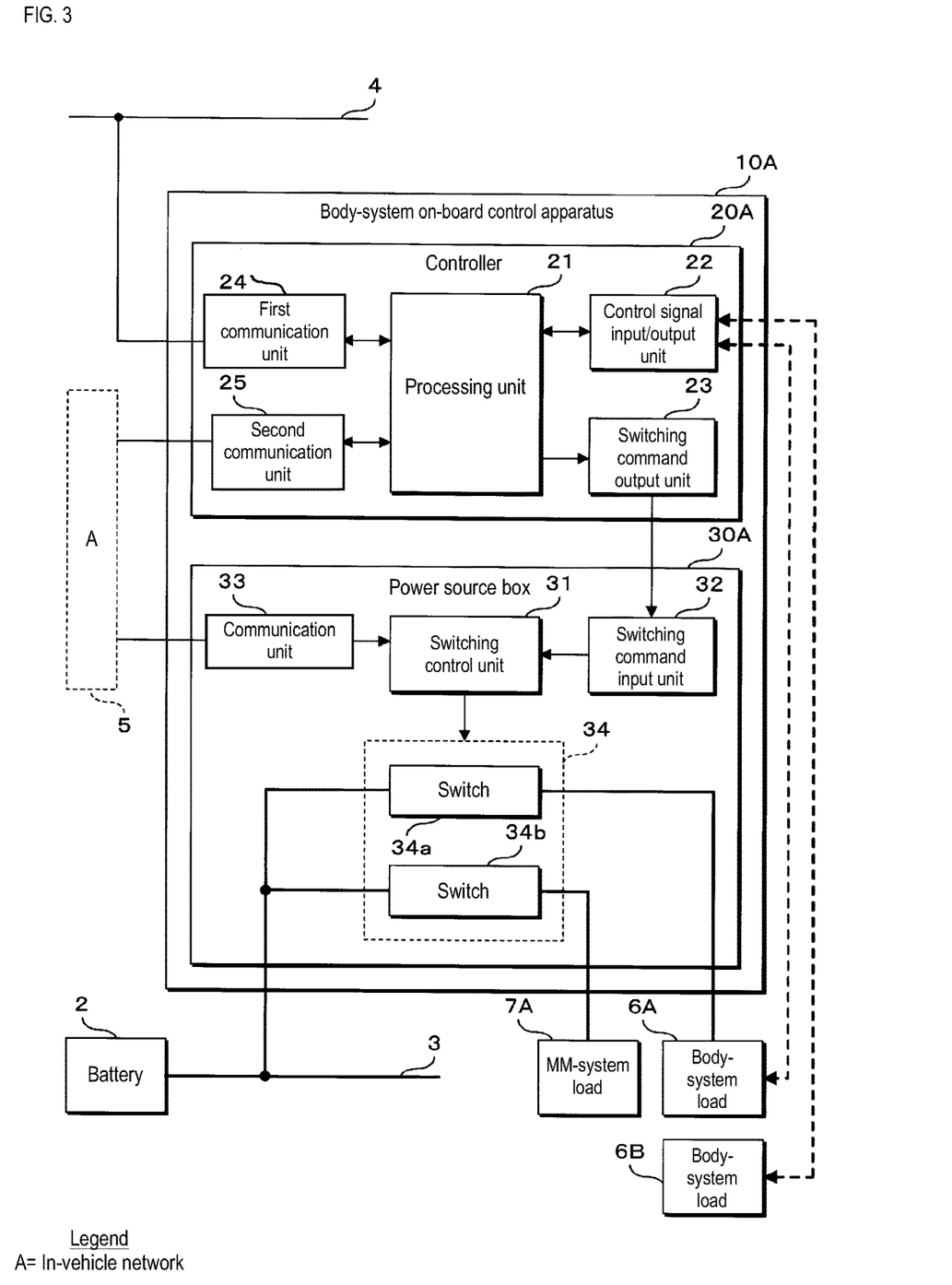
FIG. 3 is a block diagram showing a configuration of a body-system on-board control apparatus.

FIG. 3 is a block diagram showing the configuration of the body-system on-board control apparatus 10A. Note, that the configuration of the multimedia-system on-board control apparatus 10B is the same as the configuration of the body-system on-board control apparatus 10A, and thus illustration and description thereof are omitted. The body-system on-board control apparatus 10A according to the present embodiment includes the controller 20A and the power source box 30A. The controller 20A includes a processing unit 21, a control signal input/output unit 22, a switching command output unit 23, a first communication unit 24, and a second communication unit 25. The processing unit (processor) 21 is configured using an arithmetic processing device such as a CPU (Central Processing Unit) or an MPU (Micro-Processing Unit), and executes various arithmetic processing and control processing by executing a program stored in a storage unit such as a flash memory or an EEPROM (Electrically Erasable Programmable Read Only Memory) (not shown). In the present embodiment, the processing unit 21 of the controller 20A of the body-system on-board control apparatus 10A controls the operations of the body-system loads 6A and 6B, and provides, to the power source boxes 30A and 30B, a switching command of supply and non-supply of power to the body-system loads 6A and 6B.

The control signal input/output unit 22 is connected to the body-system loads 6A and 6B to be controlled by the body-system on-board control apparatus 10A, via signal lines (indicated by thick broken arrows in FIG. 3) for transmitting control signals. The control signal input/output unit 22 outputs, to the body-system loads 6A and 6B, a control signal for controlling their operations in response to the command provided from the processing unit 21. Also, if the body-system loads 6A and 6B are devices that feed back information, such as sensors, the control signal input/output unit 22 acquires information from the body-system loads 6A and 6B, and provides the information to the processing unit 21.

The switching command output unit 23 outputs, to the power source box 30A, a command for switching between supply and non-supply of power to the body-system load 6A that is connected to the power source box 30A, in response to the command that is provided from the processing unit 21.

The first communication unit 24 is connected to the communication trunk line 4 via the communication line, and communicates with the other on-board control apparatus via the communication trunk line 4. The first communication unit 24 performs communication according to a communication protocol such as Ethernet or CAN, for example. The first communication unit 24 transmits information by converting information to be transmitted, which is provided from the processing unit 21, into an electrical signal and outputting the electrical signal to the communication line. Also, the first communication unit 24 receives information by sampling and acquiring the potential of the communication line, and provides the received information to the processing unit 21.

The second communication unit 25 is connected to the in-vehicle network 5 via the communication line, and communicates with the other on-board control apparatus via the in-vehicle network 5. The second communication unit 25 performs communication according to a communication protocol such as Ethernet or CAN, for example. The communication protocols employed for the first communication unit 24 and the second communication unit 25 may also be the same or different from each other. In the present embodiment, the second communication unit 25 transmits, to the power source box included in the other on-board control apparatus, a command for switching between supply and non-supply of power to the body-system loads that are connected to this power source box, in response to the command that is provided from the processing unit 21.

The power source box 30A of the body-system on-board control apparatus 10A includes a switching control unit 31, a switching command input unit 32, a communication unit 33, and a switch group 34. The switch group 34 includes a plurality of switches 34a and 34b. The switches 34a and 34b are individually switched between conduction and interruption under the control of the switching control unit 31. Ends on one side of the switches 34a and 34b are connected to the power source trunk line 3 via a power line, and ends on the other side of the switches 34a and 34b are connected to the respective loads. In this example, the body-system load 6A is connected to the switch 34a, and the multimedia-system load 7A is connected to the switch 34b.

The switching command input unit 32 receives a switching command from the controller 20A, and provides the received switching command to the switching control unit 31. The switching control unit 31 switches between conduction and interruption of the switches 34a and 34b of the switch group 34, in response to the switching command that is received by the switching command input unit 32. Note that, of the switches 34a and 34b, the switch that is switched by the switching control unit 31 in response to the switching command received by the switching command input unit 32 is the switch 34a, which is connected to the body-system load 6A to be controlled by the controller 20A of the body-system on-board control apparatus 10A (that is, the load to which a control signal is provided from the controller 20A).

The communication unit 33 is connected to the in-vehicle network 5 via the communication line, and communicates with the other on-board control apparatus via the in-vehicle network 5. The communication protocol employed for the communication unit 33 is the same as the communication protocol employed for the second communication unit 25 of the controller 20A. In the present embodiment, the communication unit 33 receives a switching command that is transmitted from the controller of the other on-board control apparatus via the in-vehicle network 5, and receives the switching command from the other on-board control apparatus. The communication unit provides the received switching command to the switching control unit 31.

The switching command that is input to the power source box 30A from the controller 20A of the body-system on-board control apparatus 10A includes, for example, information specifying an object to be switched such as the identification numbers of the switches 34a and 34b of the power source box 30A or the identification numbers (e.g., port numbers) of the connection terminals for connecting the loads, and information specifying whether the object to be switched is switched to the supply state of power or the non-supply state of power. Alternatively, the switching command may also include information specifying the identification numbers of the loads. In this case, the power source box 30A stores the correspondence between the identification information of the loads and the switches 34a and 34b to which the loads are connected.

The switching command that is transmitted to the power source box of the other on-board control apparatus via the in-vehicle network 5 by the second communication unit 25 included in the controller 20A of the body-system on-board control apparatus 10A and the switching command that is transmitted by the controller of the other on-board control apparatus and is received by the communication unit 33 of the power source box 30A of the body-system on-board control apparatus 10A include the identification information of the on-board control apparatuses, the identification information of the switches 34a and 34b, and the information specifying the supply state of power and the non-supply state of power.

The switching control unit 31 switches between conduction and interruption of the switches 34a and 34b of the switch group 34 in response to the switching command that is provided from the switching command input unit 32 and the switching command that is provided from the communication unit 33, and switches between supply and non-supply of power to the loads that are connected to the power source box 30A.

Note, that in the plurality of switches 34a and 34b included in the switch group 34, the switch that is switched in response to the switching command from the controller 20A of the on-board control apparatus in which that switch is included and the switch that is switched in response to the switching command from the other on-board control apparatus via the in-vehicle network 5 may be distinguished from each other. The switch 34a may be defined to be connected to the body-system load 6A, and not to be connected to the multimedia-system load 7A, for example.

Alternatively, the plurality of switches 34a and 34b included in the switch group 34 may also be switched by one of the switching command from the controller 20A of the on-board control apparatus in which the switches are included and the switching command from the other on-board control apparatus. In this configuration, a configuration may also be employed in which the switching control unit 31 stores the correspondence between the loads connected to the switches 34a and 34b and the on-board control apparatuses that control these loads, it is determined whether the correspondence between the on-board control apparatus that is the output source of the provided switching command and the load to be switched is valid, and the switching is not performed if the switching command is not a valid switching command.

Flowchart

Figure 4:
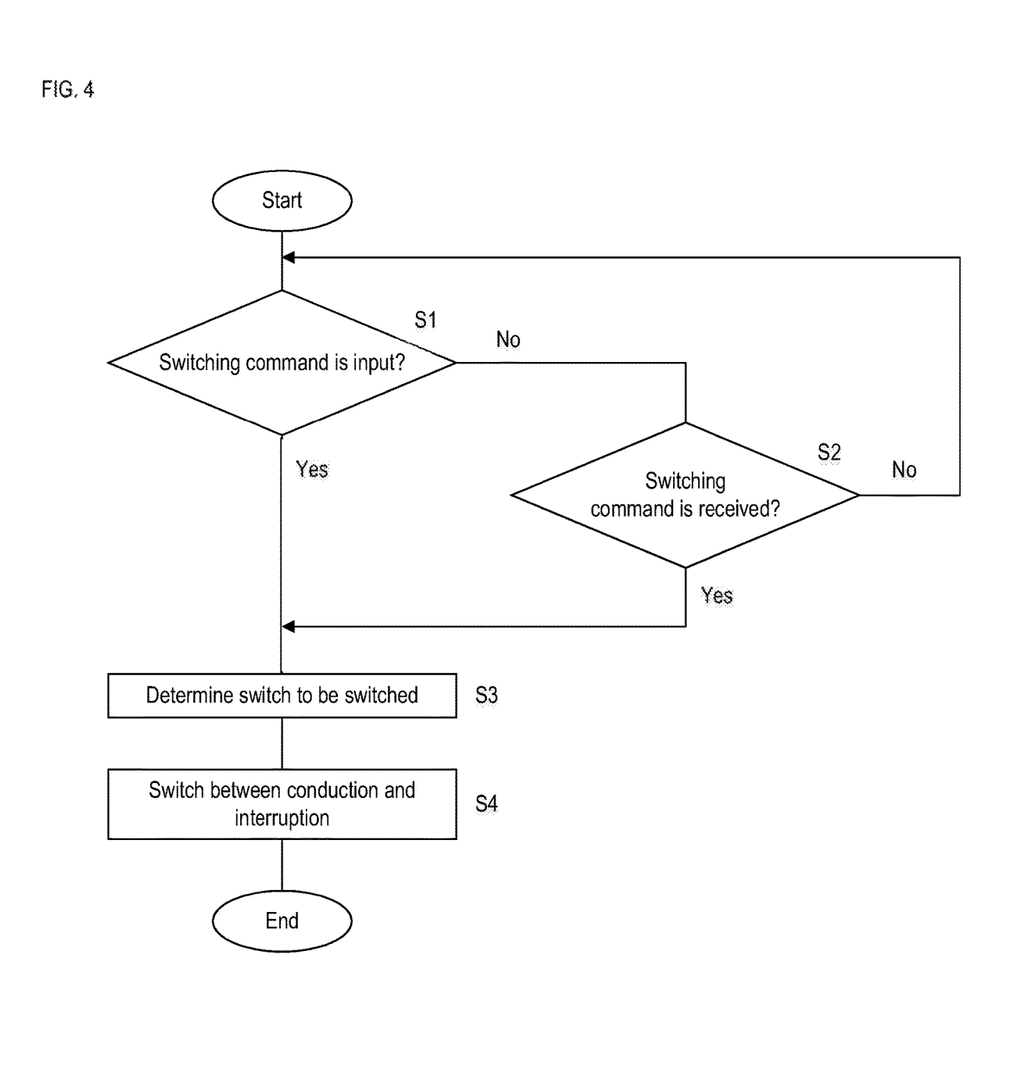
FIG. 4 is a flowchart showing the procedure of a switching control process performed by a power source box of the body-system on-board control apparatus.

FIG. 4 is a flowchart showing the procedure of a switching control process performed by the power source box 30A of the body-system on-board control apparatus 10A. Note, that the switching control process performed by the power source box 30B of the multimedia-system on-board control apparatus 10B is the same as the process shown in this flowchart, and thus illustration and description of the corresponding flowchart are omitted. The switching control unit 31 of the power source box 30A of the body-system on-board control apparatus 10A determines whether a switching command from the switching command output unit 23 of the controller 20A is input to the switching command input unit 32 (step S1). If a switching command is not input from the controller 20A (NO in step S1), the switching control unit 31 determines whether the communication unit 33 receives a switching command from the other on-board control apparatus (step S2). If a switching command is not received from the other on-board control apparatus, the switching control unit 31 returns the process to step S1, and waits until a switching command is provided from the controller 20A or the other on-board control apparatus.

If a switching command is input from the controller 20A (YES in step S1), or if a switching command is received from the other on-board control apparatus (YES in step S2), the switching control unit 31 determines the switch 34a or 34b to be switched, from the plurality of switches 43a and 43b included in the switch group 34, based on the information included in the switching command (step S3). Then, the switching control unit 31 switches between conduction and interruption of the switch 34a or 34b to be switched based on the information included in the switching command (step S4), and ends the processing.

SUMMARY

The on-board power supply system according to the present embodiment having the above configuration includes, in the vehicle 1, the on-board control apparatuses (the body-system on-board control apparatus 10A and the multimedia-system on-board control apparatus 10B) in which the controllers 20A and 20B for controlling the operations of the controlled devices (the loads) and the power source boxes 30A and 30B for switching between supply and non-supply of power to the loads from the power source (the battery 2) are integrated.

The multimedia-system load 7A to be controlled by the controller 20B of the multimedia-system on-board control apparatus 10B is connected to the power source box 30A of the body-system on-board control apparatus 10A via a power line. The power source box 30A of the body-system on-board control apparatus 10A switches between supply and non-supply of power to the multimedia-system load 7A that is connected to the power source box 30A, in response to a switching command from the controller 20B of the multimedia-system on-board control apparatus 10B.

Also, the body-system load 6B to be controlled by the controller 20A of the body-system on-board control apparatus 10A is connected to the power source box 30B of the multimedia-system on-board control apparatus 10B via a power line, for example. The power source box 30B of the multimedia-system on-board control apparatus 10B switches between supply and non-supply of power to the body-system load 6B that is connected to the power source box 30B, in response to a switching command from the controller 20A of the body-system on-board control apparatus 10A.

As mentioned above, even in the case in which the on-board control apparatuses in which the controllers 20A and 20B and the power source boxes 30A and 30B are integrated are mounted in the vehicle 1, the degree of freedom of connection between the power source boxes 30A and 30B of the on-board control apparatuses and the loads via a power line in the vehicle 1 is increased, by making it possible to connect loads that are not to be controlled by the corresponding controller 20A and 20B to the power source boxes 30A and 30B of the on-board control apparatuses. This makes it possible to suppress an increase in the amount of the power lines mounted in the vehicle 1.

In the present embodiment, the power source box 30A of the body-system on-board control apparatus 10A is provided with the switches 34a and 34b for switching supply and non-supply of power to the loads, the communication unit 33 that receives a switching command from the other on-board control apparatus, and the switching control unit 31 that switches between conduction and interruption of the switches 34a and 34b in response to the received switching command. With this configuration, the power source box 30A integrated in the body-system on-board control apparatus 10A can switch between supply and non-supply of power to the multimedia-system load 7A that is not to be controlled by the controller 20A, without hindering the processing of the controller 20A that controls the operations of the body-system loads 6A and 6B. The same applies to the multimedia-system on-board control apparatus 10B.

In the present embodiment, the communication unit 33 of the power source box 30A receives a switching command from the other on-board control apparatus via the in-vehicle network 5. With this configuration, it is not necessary to provide a separate signal line for transmitting and receiving a switching command, because the power source box 30A can receive a switching command from the other on-board control apparatus using the existing in-vehicle network 5. Accordingly, it is possible to suppress an increase in the amount of the signal lines mounted in the vehicle 1.

In the present embodiment, if a plurality of on-board control apparatuses and a plurality of loads are mounted in the vehicle 1, each load is connected to the power source box of the nearest on-board control apparatus via a power line, and the load is connected, via a signal line, to the controller of the on-board control apparatus that controls that load. The body-system load 6A and the multimedia-system load 7A that are disposed in the vicinity of the body-system on-board control apparatus 10A are connected to the power source box 30A of the body-system on-board control apparatus 10A via a power line, and the body-system load 6B and the multimedia-system load 7B that are disposed in the vicinity of the multimedia-system on-board control apparatus 10B are connected to the power source box 30B of the multimedia-system on-board control apparatus 10B via a power line, for example. Note, that the body-system loads 6A and 6B are connected, via signal lines, to the controller 20A of the body-system on-board control apparatus 10A that controls these loads, and the multimedia-system load 7A and 7B are connected, via signal lines, to the controller 20B of the multimedia-system on-board control apparatus 10B that controls these loads. In this manner, the length of the power line that connects the power source boxes 30A and 30B of the on-board control apparatuses and the loads can be shortened.

In the present embodiment, as an on-board control apparatus in which a controller and a power source box are integrated, two on-board control apparatuses, the body-system on-board control apparatus 10A and the multimedia-system on-board control apparatus 10B, are mounted in the vehicle 1. But the present disclosure is not limited to this configuration. The on-board control apparatuses may be apparatuses other than a body-system on-board control apparatus and a multimedia-system on-board control apparatus, and the loads may be loads other than a body-system load and a multimedia-system load. Also, three or more on-board control apparatuses may be mounted in the vehicle 1. A configuration is employed in which the controller and the power source box of the on-board control apparatus transmit and receive a switching command via the in-vehicle network 5, but the present disclosure is not limited to this configuration. A configuration may also be employed in which the controller of one of the on-board control apparatuses and the power source box of the other on-board control apparatus to which the load controlled by this controller is connected are connected using a signal line, and a switching command that switches between conduction and interruption of a switch is directly provided from the controller of the one of the on-board control apparatuses to the power source box of the other on-board control apparatus via the signal line. The methods of the modifications described below may also be employed as the method of transmission and reception of a switching command between the on-board control apparatuses.

First Modification

Figure 5:
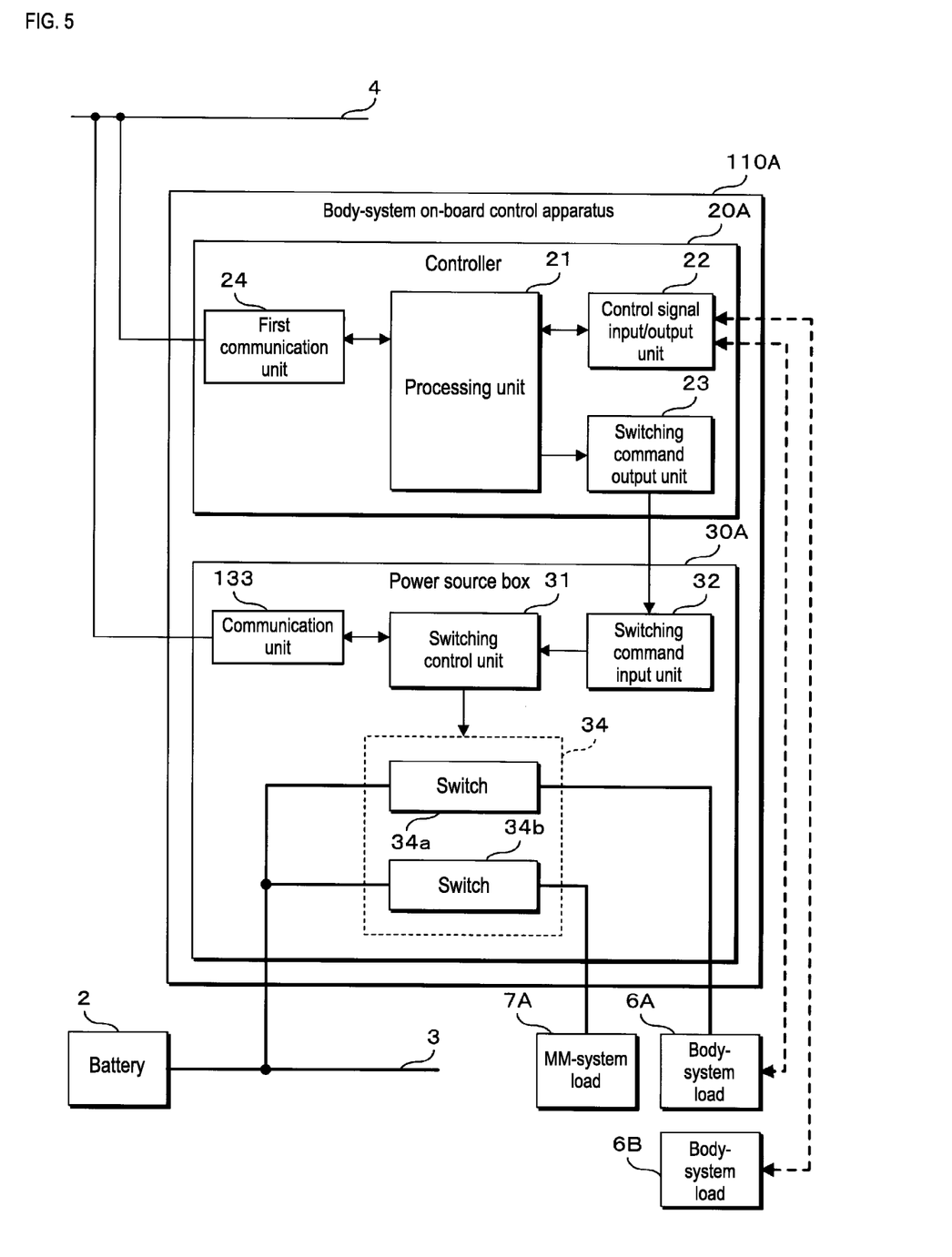
FIG. 5 is a block diagram showing a configuration of a body-system on-board control apparatus according to a first modification.

FIG. 5 is a block diagram showing a configuration of a body-system on-board control apparatus 110A according to a first modification. In the on-board power supply system according to the first modification, a switching command from the controller of one of the on-board control apparatus to the power source box of the other on-board control apparatus is transmitted and received via the communication trunk line 4, not via the in-vehicle network 5. Accordingly, the controller 20A of the body-system on-board control apparatus 110A according to the first modification includes no second communication unit 25 that performs communication via the in-vehicle network 5, and transmits a switching command to the power source box of the other on-board control apparatus using the first communication unit 24. The power source box 30A of the body-system on-board control apparatus 110A according to the first modification includes a communication unit 133 that performs communication via the communication trunk line 4, instead of the communication unit 33 that performs communication via the in-vehicle network 5. In this manner, the power source box 30A can receive a switching command from the other on-board control apparatus using the communication unit 133 via the communication trunk line 4.

Second Modification

Figure 6:
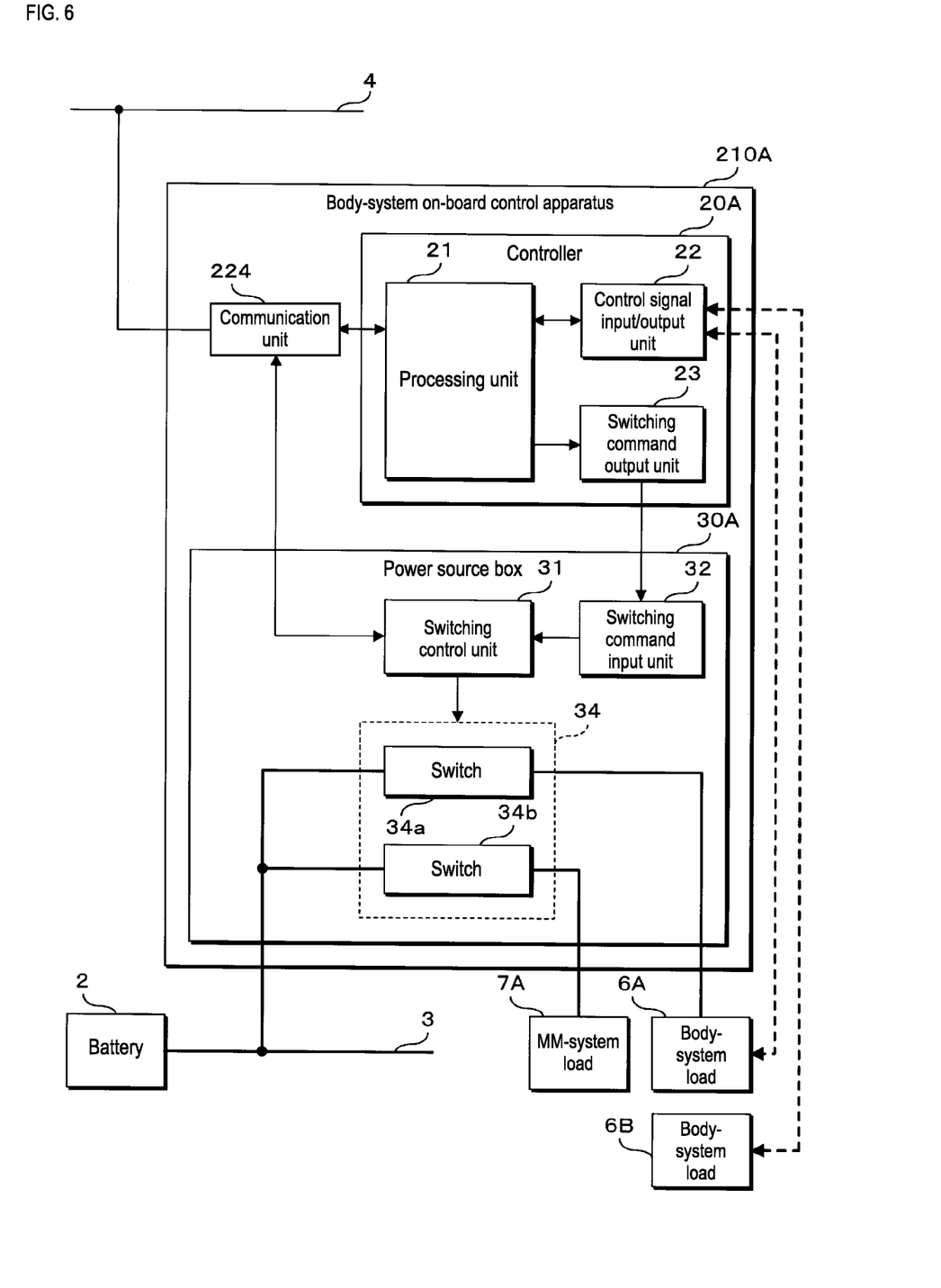
FIG. 6 is a block diagram showing a configuration of a body-system on-board control apparatus according to a second modification.

FIG. 6 is a block diagram showing a configuration of a body-system on-board control apparatus 210A according to a second modification. The on-board power supply system according to the second modification is the same as the first modification in that a switching command is transmitted from the controller of one of the on-board control apparatuses to the power source box of the other on-board control apparatus via the communication trunk line 4. Note, that in the body-system on-board control apparatus 210A according to the second modification, the controller 20A and the power source box 30A share one communication unit 224, and perform communication via the communication trunk line 4. The communication unit 224 may also be included in either the controller 20A or the power source box 30A. In this manner, by the controller 20A and the power source box 30A sharing one communication unit 224, the number of communication units (e.g., communication ICs) mounted on the body-system on-board control apparatus 310A can be reduced, and the cost of the body-system on-board control apparatus 10A can be reduced.

Third Modification

Figure 7:
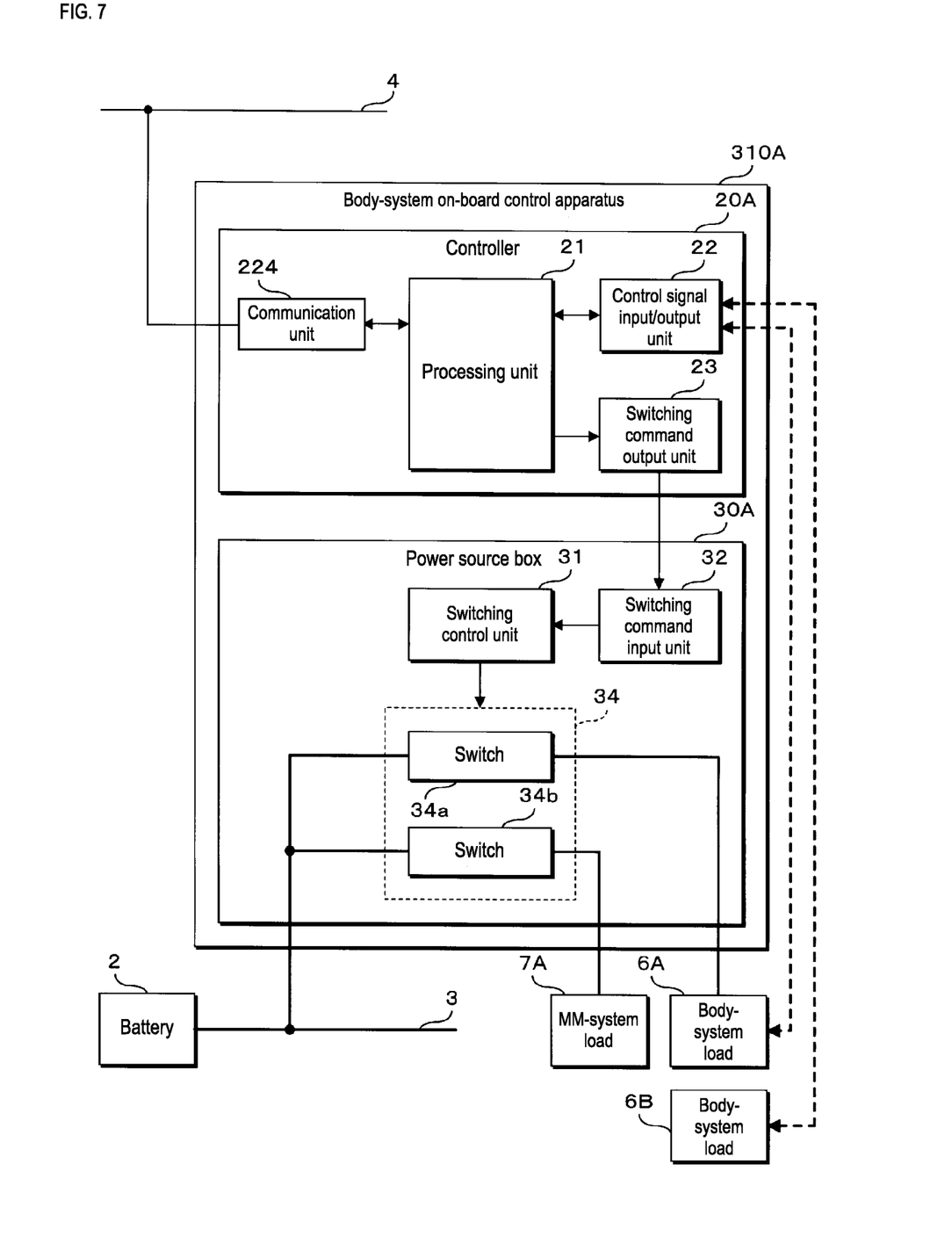
FIG. 7 is a block diagram showing a configuration of a body-system on-board control apparatus according to a third modification.

FIG. 7 is a block diagram showing a configuration of a body-system on-board control apparatus 310A according to a third modification. Similar to the body-system on-board control apparatus 210A according to the second modification, the body-system on-board control apparatus 310A according to the third modification includes only one communication unit 224. Note, that in the body-system on-board control apparatus 310A according to the third modification, the power source box 30A does not directly transmit and receive information to and from the communication unit 224. Instead, if the communication unit 224 receives a switching command from the other on-board control apparatus, the controller 20A outputs, to the power source box 30A, the switching command from the switching command output unit 23. With this configuration, the power source box 30A can receive a switching command from the other on-board control apparatus via the controller 20A, and can switch between conduction and interruption of the switches 34a and 34b in response to the received switching command. In this configuration, the power source box 30A does not need to distinguish whether the provided switching command is transmitted from the controller of the other on-board control apparatus or from the controller 20A provided on the body-system on-board control apparatus 10A in which the power source box 30A is included.

The invention claimed is:

1. An on-board power supply system comprising:
at least two electronic control units each including a controller and a power source box, the controller is connected to an electrical device mounted in a vehicle via a signal line and that is configured to control an operation of the corresponding electrical device, and the power source box is connected to a power source mounted in the vehicle via a power line, the power source box is connected to the electrical device mounted in the vehicle via the power line, and the power source box is configured to switch between supply and non-supply of power from the power source to the electrical device,
wherein, the electrical device that is to be controlled by the controller included in one of the at least two electronic control units is connected to the power source box of the other of the at least two electronic control units, and
the power source box included in the other of the at least two electronic control units is configured to switch between supply and non-supply of power to the electrical device that is connected to the other of the at least two electronic control units, in response to a switching command from the controller included in the one of the at least two electronic control units.

2. The on-board power supply system according to claim 1,
wherein the power source boxes each include:
a switch that is disposed in a power supply path from the power source to the electrical device;
a reception unit configured to receive an input of the switching command; and
a switching control unit configured to switch between conduction and interruption of the switch in response to the switching command received by the reception unit.

3. The on-board power supply system according to claim 2,
wherein each reception unit is configured to receive the switching command via an in-vehicle network provided in the vehicle.

4. The on-board power supply system according to claim 1,
wherein the electrical device is a plurality of electrical devices, and wherein the at least two electronic control units and the plurality of electrical devices are mounted in the vehicle, and
each electrical device of the plurality of electrical devices is connected to the power source box of a nearest one of the at least two electronic control units via the power line, and is connected to the controller of the one of the at least two electronic control units is configured to control the electrical device via the signal line.

5. The on-board power supply system according to claim 2,
wherein the electrical device is a plurality of electrical devices, and wherein the at least two electronic control units and the plurality of electrical devices are mounted in the vehicle, and
each electrical device is connected to the power source box of a nearest one of the at least two electronic control units via the power line, and is connected to the controller of the one of the at least two electronic control units that is configured to control the electrical device via the signal line.

6. The on-board power supply system according to claim 3,
wherein the electrical device is a plurality of electrical devices, and wherein the at least two electronic control units and the plurality of electrical devices are mounted in the vehicle, and
each electrical device is connected to the power source box of a nearest one of the at least two electronic control units via the power line, and is connected to the controller of the one of the at least two electronic control units that is configured to control the electrical device via the signal line.

* * * * *